United States Patent [19]
Kamiyama et al.

[11] Patent Number: 5,501,115
[45] Date of Patent: Mar. 26, 1996

[54] METHOD OF INSPECTING A PIPE LINER BAG

[75] Inventors: Takao Kamiyama, Hiratsuka; Yasuhiro Yokoshima, Ibaraki; Shigeru Endoh, Kasukabe, all of Japan

[73] Assignees: Shonan Gosei-jushi, Seisakusho K.K.; Yokoshima & Company; Get Inc., all of, Japan

[21] Appl. No.: 275,104

[22] Filed: Jul. 14, 1994

[30] Foreign Application Priority Data

Jul. 28, 1993 [JP] Japan ................................ 5-185788

[51] Int. Cl.⁶ .................................................. G01M 3/12
[52] U.S. Cl. ...................................... 73/865.8; 73/40.5 R
[58] Field of Search .......................... 73/40, 40.5 R, 73/49.1, 865.8; 137/15, 559; 138/97, 98; 348/84, 85

[56] References Cited

U.S. PATENT DOCUMENTS

| | | | |
|---|---|---|---|
| 4,002,055 | 1/1977 | Kops | 73/40 |
| 5,072,622 | 12/1991 | Roach et al. | 73/40.5 R |
| 5,220,822 | 6/1993 | Tuma | 73/40.5 R |

FOREIGN PATENT DOCUMENTS

| | | | |
|---|---|---|---|
| 4135153 | 4/1993 | Germany | 73/49.1 |
| 60-242038 | 2/1985 | Japan | |
| 8705105 | 8/1987 | WIPO | 73/40.5 R |

*Primary Examiner*—Robert Raevis
*Attorney, Agent, or Firm*—Whitham, Curtis, Whitham & McGinn

[57] ABSTRACT

A method of inspecting a pipe liner bag is provided for efficiently and accurately performing in parallel inspections for a hardened condition and air-tight sealing effect of the pipe liner bag. A main pipe and a branch pipe are lined with hardened pipe liner bags, and then all open ends of the pipe liner bags are air-tightly sealed by air plugs to define an air-tight sealed space S within the pipe liner bags. Then, while the pressure within the sealed space is decreased, the inspections are made for a hardened condition and air-tight sealing effect of the pipe liner bag. If the pipe liner bag includes incompletely hardened portions, such portions will be deformed due to compression buckling, so that the deformed portions can be readily found by a TV camera equipped with a light emitting unit. In this manner, a hardened condition of the pipe liner bag can be accurately inspected. Also, if the pipe liner bag do not provide a sufficient air-tight sealing effect, the inner pressure within the sealed space will be increased, so that monitoring the inner pressure within the sealed space by a vacuum gauge permits an inspection to be readily and accurately made for an air-tight sealing effect of the pipe liner bags.

15 Claims, 1 Drawing Sheet

METHOD OF INSPECTING A PIPE LINER BAG

BACKGROUND OF THE INVENTION

1. Field of the Invention

The present invention relates to pipe lining techniques, and more particularly to a method of inspecting a pipe liner bag.

2. Description of the Related Art

When an underground pipe, such as pipelines and passageways, becomes defective or too old to perform properly, the pipe is repaired and rehabilitated without digging the earth to expose the pipe and disassembling the sections of the pipe. This non-digging method of repairing an underground pipe has been known and practiced commonly in the field of civil engineering. Typically, the method is disclosed by Japanese Provisional Patent Publication (Kokai) No. 60-242038.

According to the method described in the above-mentioned publication, the pipe repair method comprises inserting a sufficiently long tubular flexible liner bag into the pipe to be repaired by means of a pressurized fluid, like air and water. The tubular liner bag is made of a flexible resin-absorbent material impregnated with a thermosetting resin, and has the outer surface covered with an impermeable plastic film.

More particularly, according to the publication, the tubular flexible liner bag is closed at one end and open at the other; the tubular flexible liner bag is first flattened, then, the closed end of the tubular liner bag is tied to a control rope; the open end of the tubular liner bag is made to gape wide and hooked (anchored) at the end of the defective or old pipe in a manner such that the wide-opened end of the liner completely and fixedly covers and closes the pipe end; a portion of the liner is pushed into the pipe; then, the pressurized fluid is applied to the portion of the tubular liner such that the fluid urges the tubular liner to enter the pipe. Since one end of the tubular liner is hooked at the end of the pipe, it remains there while the rest of the flexible liner bag is turned inside out as it proceeds deeper in the pipe. (Hereinafter, this manner of procedure shall be called "everting".) When the entire length of the tubular liner bag is everted (i.e., turned inside out) into the pipe, the control rope holds the closed end of the tubular liner bag to thereby control the length of the tubular liner in the pipe. Then, the everted tubular liner is pressed against the inner wall of the pipe by the pressurized fluid, and the tubular flexible liner is hardened as the thermosetting resin impregnated in the liner is heated, which is effected by heating the fluid filling the tubular liner bag by means of a hot steam, etc. It is thus possible to line the inside wall of the defective or old pipe with a rigid liner without digging the ground and disassembling the pipe sections.

After the pipe has been lined by the method mentioned above, it is necessary to inspect how the lined material is hardened and whether an air-tight sealing effect is sufficient or not. Conventionally, the inspection for hardened lining material has been carried out by a self-running TV camera or the like which is introduced into a pipe liner bag to monitor a hardened state of the pipe liner bag on the repaired inner wall of the pipeline. Also, for inspecting the air-tight condition, the pipe liner bag is filled with water which is held therein for a predetermined time period, such that an amount of water decreased during that time period is detected to determined whether the air-tight sealing effect is sufficiently provided.

However, the conventional method using a self-running TV camera or the like for inspecting a hardened condition allows only the inner wall lined with the lining material of the pipeline to be inspected but cannot accurately determine whether or not the lining material on the inner wall of the pipeline has been completely hardened.

Also, the method of filling a pipe liner bag with water for inspecting an air-tight condition has drawbacks in that the provision of a large amount of water is difficult, and this inspection requires a lot of facilities, operators and steps.

Further, conventionally, the above two inspections for the hardened condition of the lining material and for the air-tight condition are made in separate procedures so that these inspections require a lot of labor and time.

OBJECT AND SUMMARY OF THE INVENTION

The present invention has been made in view of the above-mentioned problems, and it is an object of the present invention to provide a method of inspecting a pipe liner bag which is capable of efficiently and accurately inspecting a hardened condition of a pipe liner bag and an air-tight condition of a repaired pipeline in a single procedure.

To achieve the above object, the present invention provides a method of inspecting a pipe liner bag for use in repairing a pipeline, comprising the steps of: lining the inner wall of a pipeline with a hardened pipe liner bag; air-tightly sealing all open ends of the pipe liner bag; decreasing an inner pressure within the sealed pipe liner bag; and inspecting a hardened condition and an air-tight sealing effect provided by the pipe liner bag.

According to the above-mentioned method, the inside of the pipe liner bag after a lining operation has been completed is held in a depressed state, so that if an incompletely hardened portion exist on the pipe liner bag, such a portion will be deformed due to compression buckling. It is therefore possible to readily find deformed portions on the pipe liner bag, for example, by the use of a TV camera which travels inside the pipe liner bag, whereby a hardened condition of the pipe liner bag can be accurately inspected.

Further, if the pipe liner bag provides an insufficient air-tight sealing effect, air will penetrate into the pipe liner bag to cause the inner pressure within the pipe liner bag to rise. Therefore, by monitoring the inner pressure within the pipe liner bag, for example, by a vacuum gauge, an air-tight sealing effect provided by the pipe liner bag can be readily and accurately inspected.

Since the inspecting method according to the present invention parallelly inspects a hardened condition and air-tight sealing effect of the pipe liner bag without employing a large amount of water, which would be required by the conventional method, the inspections can efficiently progress and be completed in a shorter time period.

The above and other objects, advantages and features of the invention will appear more fully hereinafter in the following description given in connection with the accompanying drawings and the novelty thereof pointed out in the appended claims.

DESCRIPTION OF THE PREFERRED EMBODIMENT

Figure 1:
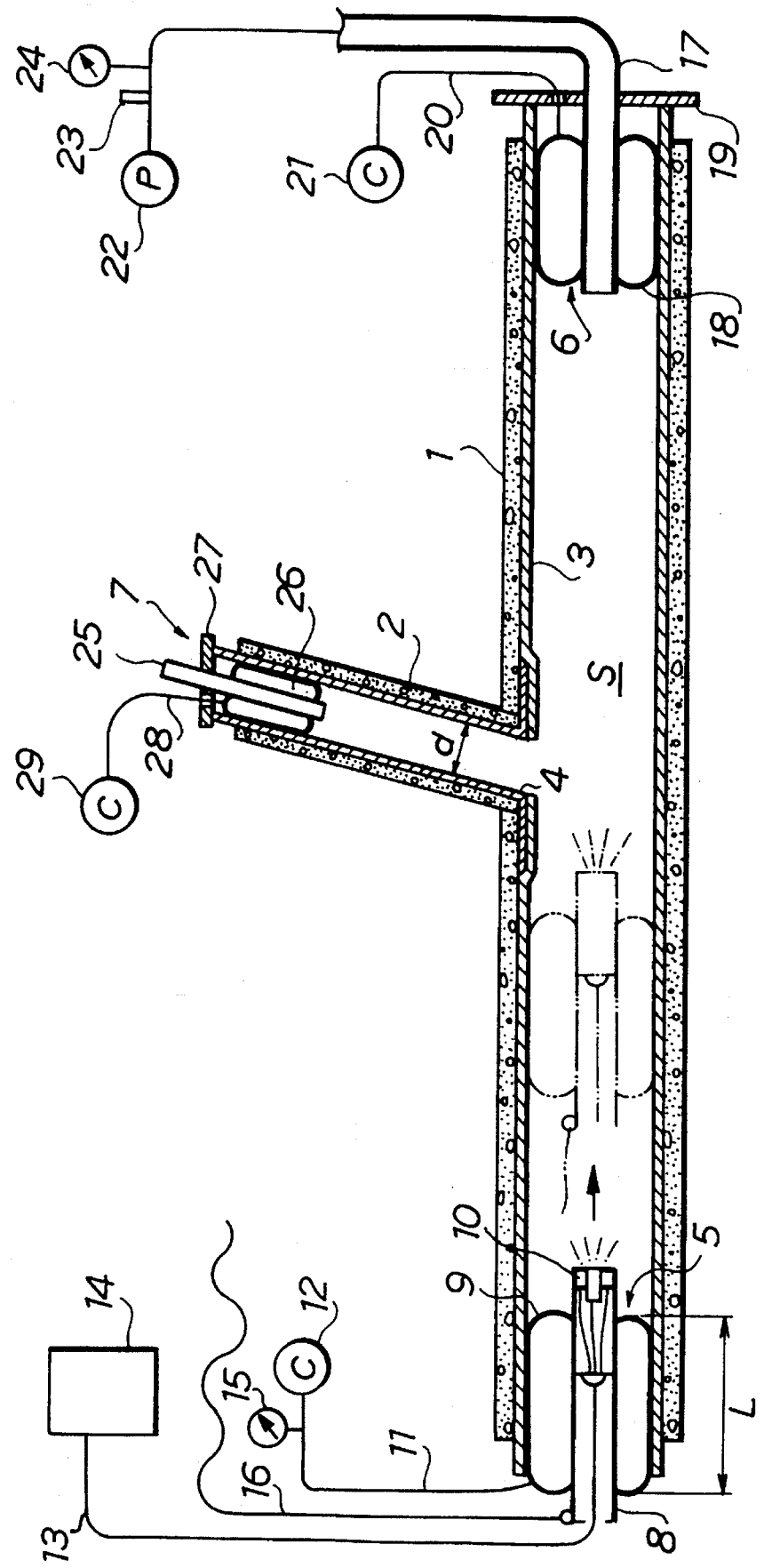
FIG. 1 is a cross-sectional view of part of pipe lines for explaining a method of inspecting pipe liner bags according to the present invention.

The present invention will hereinafter be described in conjunction with the preferred embodiment thereof with reference to the accompanying drawing.

FIG. 1 is a cross-sectional view of part of pipelines for explaining the method of the present invention. FIG. 1 shows part of underground pipelines, which may be sewage pipelines, electric cable pipelines, or the like, comprising a main pipe 1 and a branch pipe 2 which has a diameter smaller than that of the main pipe 1 and is branched from the same.

The main pipe 1 and the branch pipe 2 have been lined by the aforementioned pipeline repair method so that the main pipe 1 and the branch pipe 2 have the inner walls thereof lined by pipe liner bags 3, 4, respectively.

Specifically explaining, the pipe liner bags 3, 4 impregnated with an unhardened thermosetting resin are everted into the main pipe 1 and the branch pipe 2, respectively, and then pressed against the inner walls of the main pipe 1 and the branch pipe 2 with the pressure inside thereof maintained at a constant value. The pipe liner bags 3, 4 are heated while that state is maintained to harden the thermosetting resin impregnated therein. In this manner, the inner walls of the main pipe 1 and the branch pipe 2 are lined by the hardened pipe liner bags 3, 4, respectively. It will be understood that part of the pipe liner bag 3 corresponding to the connection of the branch pipe 2 to the main pipe 1 is cut away by a cutter or the like.

After the main pipe 1 and the branch pipe 2 have been lined as described above, a hardened condition and air-tight sealing effect of the pipe liner bag 3, for example, are inspected in the following procedure.

First, all of open ends of the pipe liner bags 3, 4, that is, both open ends of the pipe liner bag 3 and the upper open end of the pipe liner bag 4 are air-tightly sealed respectively by a movable air plug 5 and an air plugs 6, 7 having stoppers 19, 27, as illustrated, thus defining an air-tightly sealed space S within the pipe liner bags 3, 4.

The movable air plug 5 is formed of a cylindrical body 8 and an air bag 9 mounted around the outer periphery of the cylindrical body 8, and a TV camera 10 equipped with a light emitting means is incorporated in a front end portion of the cylindrical body 8. The length L of the air bag 9 is set to be larger than the diameter d of the branch pipe 2 (L>d).

The air bag 9 is connected to a compressor 12 through an air hose 11, while the TV camera 10 with the light emitting means is electrically connected to a TV monitor 14 through an electric cable 13. Incidentally, a pressure gauge 15 may be connected in a midway of the air hose 11. Also, the rear end of the cylindrical body 8 is connected with a rope 16 for speed adjustment.

The air plug 6 with a stopper in turn is formed of a vacuum pipe 17 having one end open to the air-tight space S, and an air bag 18 and a disk-shaped stopper 19 both mounted around the outer periphery of the vacuum pipe 17. The air bag 18 is connected to a compressor 21 through an air hose 20. The vacuum pipe 17 is connected to a vacuum pump 22 with a safety valve 23 and a vacuum gauge 24 being mounted in a midway therebetween.

The air plug 7 with a stopper is formed of a cylindrical body 25 having both ends sealed, and an air bag 26 and a disk-shaped stopper 27 mounted around the outer periphery of the cylindrical body 25. The air bag 26 is connected to a compressor 29 through an air hose 28.

with the configuration mentioned above, when the compressors 12, 21, 29 are driven to supply compressed air to the respective air bags 9, 18, 26 of the movable air plug 5 and the air plugs 6, 7 through the air hoses 11, 20, 28, respectively, the air bags 9, 18, 26 are inflated as illustrated to air-tightly seal all open ends of the pipe liner bags 3, 4.

Next, the vacuum pump 22 is driven to decrease the inner pressure of the sealed space S within the pipe liner bags 3, 4 through the vacuum pipe 17 to a predetermined value by the use of the safety valve 23 and the vacuum gauge 24, so that the sealed space S is maintained in a depressed state. In this event, the movable air plug 5 and the air plugs 6, 7 are drawn by the negative pressure prevailing in the sealed space S so that they may be brought toward the sealed space S. However, the rope 16 and the stoppers 19, 27 prevent the movable air plug 5 and the air plugs 6, 7, respectively, from being drawn to the air-tight sealed space S, whereby these air plugs 5, 6, 7 fixedly remain at the illustrated positions to air-tightly seal the open ends of the pipe liner bags 3, 4, respectively.

Since the sealed space S is held in a depressed state as described above, if the pipe liner bag 3 includes an incompletely hardened portion, this portion will be deformed due to compression buckling (the portion will protrude).

In the above-mentioned state, if the rope 16 is disconnected to release the movable air plug 5 from the fixed state, the movable air plug 5 is drawn by the negative pressure within the sealed space S to travel in the direction indicated by the arrow inside the pipe liner bag 3 along the main pipe 1. Since the TV camera 10 equipped with a light emitting means is carried by the movable air plug 5 and also travels in the same direction, with the light emitting means providing light, the TV camera 10 sequentially images the inner wall of the pipe liner bag 3 which is monitored by the TV monitor 14, thus allowing the operator to easily find possible deformation on the pipe liner bag 3. In this manner, by imaging the inner wall of the pipe liner bag 3 with the TV camera 10 and monitoring the situation on the inner wall with the TV monitor 14, it is possible to accurately inspect a hardened condition of the pipe liner bag 3 (whether or not the pipe liner bag 3 has been completely hardened) by finding whether deformed portions exist on the pipe liner bag 3. In this event, since the length L of the movable air plug 5 is set larger than the diameter d of the branch pipe 2 (L>d), the movable air plug 5, during its travel, will not be drawn into the branch pipe 2. In other words, the movable air plug 5 will not be inhibited from travelling inside the main pipe 1 when it passes the branching portion from which the branch pipe 2 is branched.

Since the movable air plug 5 starts moving at the time an absorbing force acting thereon (an absorbing force based on the negative pressure within the sealed space S) is larger than a friction force acting between the air bag 9 and the pipe liner bag 3, its movement is controlled by the inner pressure (negative pressure) within the sealed space S and the inner pressure of the air bag 9, while the travelling speed of the same is adjusted by the rope 16.

If the pipe liner bag 3 does not provide a sufficient airtight sealing effect, air penetrates into the pipe liner bag 3 to cause the inner pressure of the sealed space S to rise, so that the air-tight sealing of the pipe liner bags 3, 4 can be readily and reliably inspected by monitoring the inner pressure of the sealed space S by the vacuum gauge 24 with the safety valve 23 being closed. It should be noted that the movable air plug 5 is fixed by the rope 16 during this air-tight sealing inspection.

It will be appreciated that according to this embodiment, the inspections for hardened condition and air-tight sealing of the pipe liner bags 3, 4 can parallely progress in a single procedure without the necessity of a large amount of water which would be required by the conventional method, whereby the inspections will be efficiently completed for a shorter time period.

While the method of the present invention is particularly preferred to an inspection of a pipe liner bag which receives an external pressure such as a water pressure from the outside or the like, it is also effective to an inspection of a pipe liner bag which receives an inner pressure.

As is apparent from the above description, according to the present invention, after the inner wall of a pipeline is lined with hardened pipe liner bags, all open ends of the pipe liner bags are air-tightly sealed, and the inner pressure within the sealed pipe liner bag is decreased in order to inspect a hardened condition and air-tight sealing of the pipe liner bag, so that the inspections for hardening and air-tight sealing of the pipe liner bags can be efficiently and accurately made in parallel.

While the invention has been described in its preferred embodiment, it is to be understood that modifications will occur to those skilled in the art without departing from the spirit of the invention. The scope of the invention is therefore to be determined solely by the appended claims.

What is claimed is:

1. A method of inspecting a pipe liner bag for use in repairing a pipeline, comprising the steps of:

lining the inner wall of a pipeline with a hardened pipe liner bag;

air-tightly sealing all open ends of the pipe liner bag;

decreasing an inner pressure within the sealed pipe linear bag; and inspecting a hardened condition by detecting distortion of said sealed pipe liner bag and an air-tight sealing effect provided by the pipe liner bag in a single procedure.

2. A method according to claim 1, wherein each of the open ends of said pipe liner bag are air-tightly sealed by an air plug.

3. A method according to claim 2, wherein each said air plug comprises an air and a vacuum pipe, said air bag being coupled to a compressor such that said compressor is driven to supply compressed air to said air bag, said air bag being inflated by the supplied compressed air to air-tightly seal the open end of said pipe liner bag.

4. A method according to claim 1, wherein at least one of the open ends of said pipe liner bag is air-tightly sealed by a movable air plug, said movable air plug being equipped with a TV camera having light emitting means mounted in a front end portion thereof, said TV camera and said light emitting means being used to monitor the inside of the pipe liner bag.

5. A method according to claim 4, wherein said movable air plug travels inside the pipe liner bag by controlling an inner pressure thereof and the inner pressure within said pipe liner bag, and a travelling speed thereof is adjusted by a rope which is coupled to the rear end of said movable air plug.

6. A method according to claim 1, wherein the inner pressure within said sealed pipe liner bag is set at a predetermined value by the use of a vacuum gauge and a safety valve.

7. A method according to claim 1, wherein said step of inspecting a hardened condition and an air-tight sealing effect includes the steps of:

finding deformed portions on the pipe liner bag for inspecting a hardened condition of the pipe liner bag; and measuring the inner pressure within the sealed space for inspecting an air-tight sealing effect of the pipe liner bag.

8. A method according to claim 1, wherein said step of insepecting a hardened condition and an air-tight sealing effect includes the steps of:

finding deformed portions on the pipe liner bag for inspecting a hardened condition of the pipe liner bag with self-running inspection means, and measuring the inner pressure within the sealed space for inspecting an air-tight sealing effect of the pipe liner bag;

9. A method according to claim 8, wherein said self-running inspection means comprises optical inspection means.

10. A method according to claim 9, wherein said optical inspection means comprises a TV camera.

11. A method according to claim 1, wherein at least one of the open end of said pipe liner bag is air-tightly sealed by a fixed air plug, said fixed air plug comprising an air bag, a vacuum pipe, and a stopper restricting movement of said fixed air plug into said pipeline.

12. A method according to claim 11, wherein said air bag is coupled to a compressor such that said compressor is driven to supply compressed air to said air bag, said air bag being inflated by the supplied compressed air to air-tightly seal the open end of said pipe liner bag.

13. A method according to claim 4, wherein said movable air plug further comprises an air bag, said air bag being coupled to a compressor such that said compressor is driven to supply compressed air to said air bag, said air bag being inflated by the supplied compressed air to provide said air-tight seal of the open end of said pipe liner bag.

14. A method according to claim 1, wherein said step of inspecting a hardened condition and an air-tight sealing effect of said pipe liner bag is performed inside said pipe liner bag.

15. A method according to claim 1, wherein said pressure within said sealed pipe liner bag is a negative pressure.

* * * * *